April 15, 1958  R. P. HUMPHREY  2,830,685

CLUTCH WITH TILTABLE PLATE AND INCLINED FACE

Filed April 2, 1956

INVENTOR.
Robert P. Humphrey
BY
Otho D. Earl
Attorney.

United States Patent Office 2,830,685
Patented Apr. 15, 1958

2,830,685

CLUTCH WITH TILTABLE PLATE AND INCLINED FACE

Robert P. Humphrey, Kalamazoo, Mich., assignor to General Gas Light Company, Kalamazoo, Mich.

Application April 2, 1956, Serial No. 575,611

17 Claims. (Cl. 192—66)

This invention relates to improvements in a clutch. The principal objects of this invention are:

First, to provide a clutch for drivingly connecting and disconnecting two coaxially arranged rotatable parts which clutch is extremely compact and easily engaged and disengaged.

Second, to provide a clutch that practically instantaneously engages the clutched parts and may start its engaging motion in all relatively rotated positions of the parts.

Third, to provide a clutch which is engageable and disengageable without clashing of the clutch parts.

Fourth, to provide a clutch that is inexpensively manufactured due to the use of flat surfaces and the absence of toothed parts in the clutch.

Fifth, to provide a clutch that can be operated by various control mediums such as pneumatic or hydraulic pressure or by electrically or mechanically applied forces.

Other objects and advantages of the invention will be apparent from a consideration of the following description and claims. The drawings, of which there is one sheet, illustrate a highly practical form of the clutch.

Figure 1:
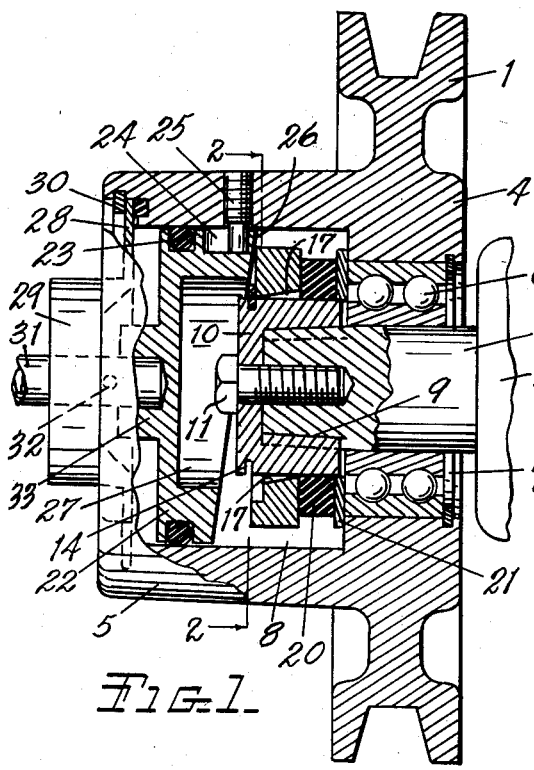
Fig. 1 is a fragmentary side elevational view of the clutch partially broken away in axial cross section along the plane of the line 1—1 in Fig. 2.
Figure 2:
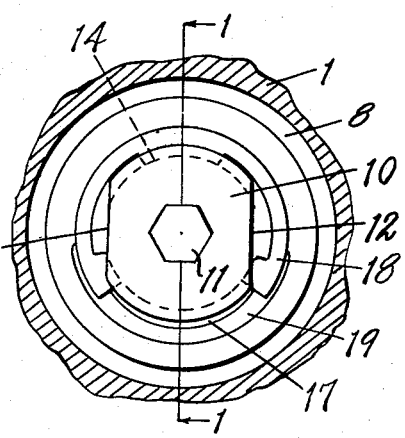
Fig. 2 is a fragmentary transverse cross sectional view taken along the plane of the line 2—2 in Fig. 1.

As in all clutches the present clutch includes a driving and driven part. While these parts may be reversed the present disclosure will consider the pulley member 1 as the driving part and the shaft member 2 as the driven part. The shaft 2 can be connected to any desired part indicated conventionally at 3 that it is desired to rotate. The drive pulley 1 includes a central hub portion 4 with a chambered housing 5 projecting axially from one side thereof oppositely from the shaft 2. A roller bearing 6 relatively rotatable supports and centers the drive pulley on the shaft 2. A snap ring 7 snapped into the hub of the pulley axially engages the outer race of the ball bearing and resists axial thrust of the clutch as will be described.

Figure 4:
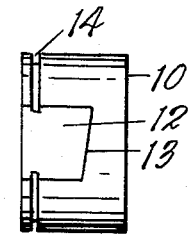
Fig. 4 is an elevational view of the clutch mounting part for the inner driven portion of the clutch assembly.
Figure 5:
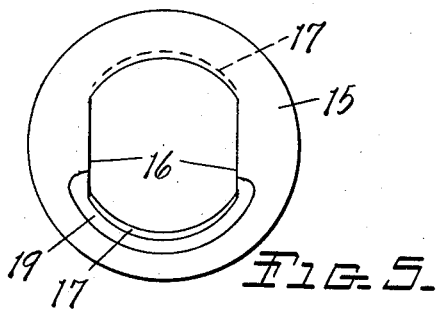
Fig. 5 is an end elevational view of the moveable clutch ring that effects engagement and disengagement of the clutch.

The end of the shaft 2 projects into the chamber 8 in the housing and is splined as at 9 to non-rotatably receive and engage a clutch mounting cap 10. The cap fits over the end of the shaft and is retained axially thereon by a screw 11. As appears more clearly in Fig. 4 the cap 10 has a cylindrical outer surface with axially extending parallel flat surfaces 12 machined on opposite sides thereof. The flat surfaces extend to the outer end of the cap and desirably terminate at the inner edges in axially inclined shoulders 13. The outer end of the cap is provided with an annular snap ring groove 14 for a purpose to be described.

The cap 10 non-rotatably receives and supports an annular clutch ring 15 which ring has parallel interior chordal surfaces 16 on opposite sides that are slidably engaged with the flat surfaces 12 on the cap. The ring thus must rotate with the cap and cannot rotate with respect thereto. The interior surfaces of the ring 15 at the ends of the chordal surfaces are oppositely axially bevelled as at 17 so that the ring may tilt on the cap from the perpendicular position shown in Fig. 1 to the axially tilted position shown in Fig. 3 where the inner face of the ring abuts against the inclined shoulders 13 at the inner edges of the flats on the cap. The clutch ring 15 is axially retained on the cap by a snap ring 18 that fits in the previously described snap ring groove 14 and the outer face of the clutch ring is axially recessed along the bottom as at 19 to receive the lower edge of the snap ring in the tilted position of the clutch ring. An axially yieldable or springable ring 20 of deformable rubber bears against the inner face of the clutch ring 15 and biases the clutch ring to perpendicular position with respect to the cap. The inner face of the yieldable ring 20 is backed up by a washer 21 bearing against the outer race of the ball bearing. The inner and outer faces of the clutch ring 15 are flat and preferably parallel so that the clutch ring is easily shaped from flat stock.

Mounted within the chamber 8 of the hub housing 5 and axially outwardly from the clutch ring 15 is a piston 22 that is slidably engaged in the cylindrical walls of the chamber 8. An O ring of yieldable material seals the periphery of the piston to the chamber wall while the axial length of the piston prevents tilting or cocking of the piston within the chamber. The periphery of the piston 22 is axially slotted as at 24 to receive the end of a screw pin 25 threaded through the side wall of the hub housing so that the piston must rotate with the pulley but may slide axially within the chamber 8. The inner face of the piston 22 is inclined as at 26 preferably at an angle equal to the angle of the shoulder 13 on the cap. The central portion of the piston 22 is recessed as at 27 to receive the outer end of the cap 10 and the head of the screw 11 and the snap ring 18 as appears in Fig. 3 but the radially outer portion of the bevelled face 26 is opposed to and engageable with the outer face of the clutch ring 15.

The outer end of the chambered hub housing 5 receives a circular closure plate 28 that supports the cylindrical body 29 of a running or rotating seal packing. The plate and seal are retained in the housing by a snap ring 30 and the seal 29 relatively rotatably seals the end of an actuating tube 31 that projects into the chamber 8. The tube 31 is adapted to be connected to a controllable source of fluid pressure such as high pressure liquid or pneumatic air pressure (not illustrated) and the tube is provided inwardly of the chamber 8 with a port 32 through which fluid pressure applied to the tube is communicated to the outer face of the piston 22. Alternatively the tube 31 may be moved mechanically by electrical solenoid or lever means (not illustrated) to apply axial pressure mechanically to the center of the piston. The inner end of the tube 31 is received in a centering boss 33 on the outer face of the piston.

With the foregoing construction and with the parts in the position illustrated in Fig. 1 it will be apparent that the drive pulley 1 and its housing 5 may rotate carrying the piston 22 with them and the innermost edge of the bevelled face of the piston will simply rotate in frictional but non-driving engagement around the periphery of the clutch ring 15 that is maintained perpendicularly to the cap 10 and shaft 2 by the yieldable ring 20. The driven shaft 2 will thus remain stationary and the hub 4 will rotate on the bearing 6 relative to the shaft.

Figure 3:
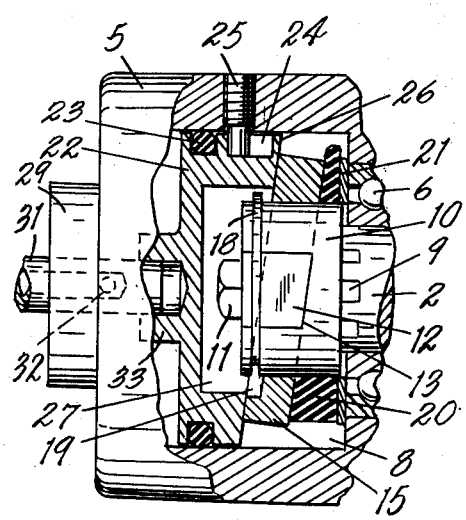
Fig. 3 is a fragmentary elevational view partially in longitudinal section illustrating the clutch parts in engaged driving position.

If now the piston 22 is forced inwardly to the position illustrated in Fig. 3 either by the application of fluid pressure through the tube 31 and port 32 or by mechanical inward movement of the tube itself the innermost portion of the piston 22 will press the clutch ring 15 axially inwardly against the yieldable resistance of the ring 20. The ring 15 will tilt axially at only one position corresponding to the top of the ring as illustrated in the drawings by axial pressure applied to any portion of the clutch ring which, of course, reaches a maximum as the innermost portion of the bevelled face of the piston moves into registry with the top of the clutch ring. As soon as the clutch ring 15 has tilted the slightest amount out of the perpendicular relationship to the cap 10 and shaft 2 there is provided an axially extending surface against which the rotating inwardly projecting portion of the piston engages as it rotates about the shaft. The piston therefore tends to pick up and rotate the clutch ring 15 and since the ring cannot rotate on the cap the cap and shaft are also rotated. Partial rotation of the piston 22 with respect to the clutch ring 15 is permitted by continued axial yielding or tilting of the clutch ring 15 against the yieldable ring 20 but a progressively increasing turning force is applied to the clutch ring and cap until the clutch ring tilts to its fully tilted position and the inner face of the piston comes into fully fixed engagement with the tilted ring as shown in Fig. 3. In this position the clutch parts are fully engaged and no relative rotation is permitted between the pulley 1 and shaft 2. To release the clutch the fluid or mechanical pressure through the tube 31 is simply released from the piston 22 and the expansible force in the yieldable ring 20 returns the piston to its retracted position and the clutch ring to its perpendicular position against the snap ring 18.

The clutch will thus engage and disengage rapidly and smoothly without clashing of the clutching parts and it will rapidly and progressively increase the turning force on the driven part from a minimum to a positively locked rotary driving engagement so that the starting force is applied rapidly but progressively to the driven part. The clutch is thus characterised by its smoothness and the rapidity of its clutching action. The yieldable ring 20 can be omitted as the rotation of the inwardly extending portion of the inclined face of the piston will act as a cam to return the clutch ring 15 to perpendicular position as the piston retracts. However, when the backing ring is omitted the clutch is noisy and engagement is practically instantaneous.

It is possible by varying the axial resistance of the backing ring 20 or by regulating the inward thrust of the piston 22, or both, to vary the rate of engagement of the clutch. A relatively stiff backing ring will create a relatively high initial starting tongue in the driven part and slowly rotate it as the projecting nose of the piston advances around the partially tilted clutch ring 15 to the fully engaged positions of the clutch parts where a 1 to 1 driving ratio is achieved.

Having thus described the invention, what is claimed as new and is desired to be secured by Letters Patent is:

1. A clutch comprising a drive pulley having a roller bearing mounted in its center and having an axially chambered hub extending axially from one side with the chamber of the hub opening to said bearing, a spindle to be driven rotatably engaged in said bearing and having an end projecting into said chamber, a cylindrical cap non-rotatably splined on said end of said shaft and axially secured to the end of the shaft, said cap having a cylindrical outer surface with parallel axially extending flat surfaces formed on opposite sides and extending to the end of the cap, a snap ring groove formed around the end of said cap, a clutch ring having flat parallel faces and fitting over said cap, the inside of said ring having parallel opposite sides non-rotatably engaged with said flat surfaces, the inside of said ring between the ends of said flat sides being oppositely axially bevelled permitting axial tilting of the ring on the cap, a snap ring in said groove retaining said ring on said cap, a yieldable ring of deformable rubber positioned between the end of said chamber and the opposed side of said first ring to bias said first ring to perpendicular position on said cap, a piston slidably mounted in said chamber and sealingly engaged with the walls thereof, a screw threaded through said hub and projecting into an axial slot in said piston to prevent rotation of said piston in said chamber, the face of said piston being recessed to receive the end of said cap and axially inclined around the recessed area, a pipe from a controllable source of fluid pressure opening into said chamber on the outer side of said piston, and means in the end of said chamber forming a running seal with said pipe.

2. A clutch comprising a drive pulley having a roller bearing mounted in its center and having an axially chambered hub extending axially from one side with the chamber of the hub opening to said bearing, a spindle to be driven rotatably engaged in said bearing and having an end projecting into said chamber, a cylindrical cap non-rotatably and axially secured to the end of the shaft, said cap having a cylindrical outer surface with parallel axially extending flat surfaces formed on opposite sides and extending to the end of the cap, a snap ring groove formed around the end of said cap, a clutch ring having flat faces and fitting over said cap, the inside of said ring having parallel opposite sides non-rotatably engaged with said flat surfaces, the inside of said ring between the ends of said flat sides being oppositely axially bevelled permitting axial tilting of the ring on the cap, a snap ring in said groove retaining said ring on said cap, a yieldable ring of deformable rubber positioned between the end of said chamber and the opposed side of said first ring to bias said first ring to perpendicular position on said cap, a piston slidably mounted in said chamber and sealingly engaged with the walls thereof, means to prevent rotation of said piston in said chamber, the face of said piston being recessed to receive the end of said cap and axially inclined around the recessed area, a pipe from a controllable source of fluid pressure opening into said chamber on the outer side of said piston, and means in the end of said chamber forming a running seal with said pipe.

3. A clutch comprising a drive pulley having a bearing mounted in its center and having an axially chambered hub extending axially from one side, a shaft to be driven rotatably engaged in said bearing and having an end projecting into said chamber, a segmental cylindrical surface with parallel axially extending flat surfaces on opposite sides and extending to the end of the shaft, a snap ring groove around the end of said shaft, a clutch ring having a flat outer face and fitting over the end of said shaft, the inside of said ring having parallel opposite sides non-rotatably engaged with said flat surfaces, the inside of said ring between the ends of said flat sides being oppositely axially bevelled permitting axial tilting of the ring on the shaft, a snap ring in said groove retaining said ring on said shaft, a yieldable ring of deformable material positioned between the end of said chamber and the opposed side of said first ring to bias said first ring to perpendicular position on said shaft, a piston slidably mounted in said chamber and sealingly engaged with the walls thereof, a pin extending through said hub and projecting into an axial slot in said piston to prevent rotation of said piston in said chamber, the face of said piston being recessed to receive the end of said shaft and axially inclined around the recessed area, a pipe from a controllable source of fluid pressure opening into said chamber on the outer side of said piston, and means in the end of said chamber forming a running seal with said pipe.

4. A clutch comprising a drive pulley having a bearing mounted in its center and having an axially chambered hub extending axially from one side, a shaft to be driven rotatably engaged in said bearing and having an end projecting into said chamber, a segmental cylindrical surface with parallel axially extending flat surfaces on opposite sides and extending to the end of the shaft, a clutch ring having a flat outer face and fitting over the end of said shaft, the inside of said ring having parallel opposite sides non-rotatably engaged with said flat surfaces, the inside of said ring between the ends of said flat sides being oppositely axially bevelled permitting axial tilting of the ring on the shaft, means retaining said ring on said shaft, a yieldable ring of deformable material positioned between the end of said chamber and the opposed side of said first ring to bias said first ring to perpendicular position on said shaft, a piston slidably mounted in said chamber, a pin extending through said hub and projecting into an axial slot in said piston to prevent rotation of said piston in said chamber, the face of said piston being recessed to receive the end of said shaft and axially inclined around the recessed area, and means extending into said chamber on the outer side of said piston to move said piston axially in said chamber.

5. A clutch comprising a pulley having a bearing mounted in its center and having an axially chambered hub on one side of the bearing, a shaft to be driven rotatably engaged in said bearing and having an end projecting into said chamber, parallel axially extending flat surfaces on opposite sides and extending to the end of the shaft, a clutch ring member having a flat outer face and fitting over said shaft, the inside of said ring member having parallel opposite sides non-rotatably engaged with said flat surfaces, the inside of said ring member between the ends of said flat sides permitting axial tilting of the ring on the shaft, axially springable means positioned between the end of said chamber and the opposed side of said ring member to bias said ring member to perpendicular position on said shaft, a slide member slidably mounted in said chamber and non-rotatably engaged with the walls thereof, a flat face on said slide member axially inclined and opposed to the end of said ring member, and controllable means for moving said slide member axially against the pressure of said springable means.

6. A clutch comprising a pulley having a bearing mounted in its center and having an axially chambered hub on one side of the bearing, a shaft to be driven rotatably engaged in said bearing and having an end projecting into said chamber, axially extending flat surfaces on the end of the shaft, a clutch ring member having a flat outer face and fitting over said shaft, the inside of said ring member having sides non-rotatably engaged with said flat surfaces, axially springable means positioned between the end of said chamber and the opposed side of said ring member to bias said ring member toward the end of said shaft, a slide member slidably mounted in said chamber and non-rotatably engaged with the walls thereof, one of said members being axially tiltable in said chamber and the other being non-tiltable, the non-tiltable one of said members having an axially inclined surface opposed to a flat surface on the other of the members, and controllable means for moving said slide member axially against the pressure of said springable means.

7. A clutch comprising a drive pulley having an axially chambered hub, a shaft to be driven having an end projecting into said chamber, parallel axially extending flat surfaces on opposite sides and extending to the end of the shaft, a clutch ring having a flat face and fitting over said shaft, the inside of said ring having parallel opposite sides non-rotatably engaged with said flat surfaces, the inside of said ring between the ends of said flat sides being oppositely axially bevelled permitting axial tilting of the ring on the shaft, axially springable means positioned between the end of said chamber and the opposed side of said ring to bias said first ring to perpendicular position on said shaft, a slide non-tiltably mounted in said chamber, means to prevent rotation of said slide in said chamber, the face of said slide being axially inclined, and means extending through the end of said chamber for moving said slide axially against the pressure of said springable means.

8. A clutch comprising a pulley having an axially chambered hub, a shaft having an end projecting into said chamber, parallel axially extending flat surfaces extending to the end of the shaft, a clutch ring having a flat face and fitting over said shaft, the inside of said ring having sides non-rotatably engaged with said flat surfaces, the inside of said ring permitting axial tilting of the ring on the shaft, axially springable means positioned between the end of said chamber and the opposed side of said ring to bias said first ring to perpendicular position on said shaft, a slide non-tiltably mounted in said chamber, means to prevent rotation of said slide in said chamber, the face of said slide being axially inclined in a plane, and means for moving said slide axially against the pressure of said springable means.

9. A clutch comprising coaxially arranged driving and driven members, one of said members being centrally chambered and the other member extending into the chamber, a bearing centering said members, coacting driving and driven clutch parts non-rotatably connected one to each of said members within said chamber, one of said clutch parts being axially slidably and non-tiltably mounted in said chamber and drivingly connected to the chambered member, the other of said clutch parts being axially tiltably mounted on the other of said members, an axially inclined plane face on said one of said clutch parts, a flat face on the other of said clutch parts opposed to said inclined face, an axially yieldable ring member biasing said other clutch part to a perpendicular position of its flat face with respect to the member with which it is drivingly engaged, and hydraulic pressure means for selectively moving said one of said clutch parts axially against the pressure of said axially yieldable member.

10. A clutch comprising coaxially arranged driving and driven members, one of said members being centrally chambered and the other member extending into the chamber, coacting driving and driven clutch parts non-rotatably connected one to each of said members within said chamber, one of said clutch parts being axially slidably and non-tiltably mounted with respect to the member to which it is drivingly connected, the other of said clutch parts being axially tiltably mounted on the member with which it is drivingly connected, an axially inclined plane face on said one of said clutch parts, a flat face on the other of said clutch parts opposed to said inclined face, an axially yieldable member biasing said other clutch part to a perpendicular position of its flat face with respect to the member with which it is drivingly engaged, and means for selectively moving said one of said clutch parts axially against the pressure of said axially yieldable member.

11. A clutch comprising coaxially arranged driving and driven members, a bearing centering said members, coacting driving and driven clutch parts non-rotatably connected one to each of said members, one of said clutch parts being axially slidably and non-tiltably mounted on the member to which it is drivingly connected, the other of said clutch parts being axially tiltably mounted on the other of said members, an axially inclined plane face on said one of said clutch parts, a flat face on the other of said clutch parts opposed to said inclined face, an axially yieldable member biasing said other clutch part to a perpendicular position of its flat face with respect to the member with which it is drivingly engaged, and fluid pressure means for selectively moving said one of said clutch parts axially against the pressure of said axially yieldable member into flat abutting engagement between said flat face and said inclined face.

12. A clutch comprising coaxially arranged driving and driven members, coacting driving and driven clutch parts non-rotatably connected one to each of said members, one of said clutch parts being axially slidably and non-tiltably mounted on the member to which it is drivingly connected, the other of said clutch parts being axially tiltably mounted on the other of said members, an axially inclined plane face on said one of said clutch parts, a flat face on the other of said clutch parts opposed to said inclined face, an axially yieldable member biasing said other clutch part to a perpendicular position of its flat face with respect to the member with which it is drivingly engaged, and means for selectively moving said one of said axially yieldable members into flat abutting engagement between said flat face and said inclined face.

13. A clutch comprising coaxially arranged driving and driven members, coacting driving and driven clutch parts non-rotatably connected one to each of said members, one of said clutch parts being axially slidably and non-tiltably mounted with respect to the member to which it is drivingly connected, the other of said clutch parts being axially tiltably mounted on the member with which it is drivingly connected, an axially inclined plane face on said one of said clutch parts, a flat face on the other of said clutch parts opposed to said inclined face, an axially yieldable member biasing said other clutch part to a perpendicular position of its flat face with respect to the member with which it is drivingly engaged, and means for selectively moving said one of said clutch parts axially against the pressure of said axially yieldable member.

14. A clutch comprising coaxially arranged driving and driven members coacting driving and driven clutch parts non-rotatably connected one to each of said members, one of said clutch parts being non-tiltably mounted with respect to the member to which it is drivingly connected, the other of said clutch parts being axially tiltably mounted on the member with which it is drivingly connected, an axially inclined plane face on said one of said clutch parts, a flat face on the other of said clutch parts opposed to said inclined face, an axially yieldable member biasing said other clutch part to a perpendicular position of its flat face with respect to the member with which it is drivingly engaged, and means for selectively moving said clutch parts relatively axially into flat abutting contact between said flat face and said inclined face.

15. A clutch comprising coaxially arranged driving and driven member, coacting driving and driven clutch parts non-rotatably connected one to each of said members, one of said clutch parts being non-tiltably mounted with respect to the member to which it is drivingly connected, the other of said clutch parts being axially tiltably mounted on the member with which it is drivingly connected, an axially inclined plane face on said one of said clutch parts, a flat face on the other of said clutch parts opposed to said inclined face, and means for selectively moving said clutch parts relatively axially into flat abutting contact between said flat face and said inclined face.

16. A clutch comprising coaxially arranged driving and driven members, coacting driving and driven clutch parts non-rotatably connected one to each of said members, one of said clutch parts being non-tiltably mounted with respect to the member to which it is drivingly connected, the other of said clutch parts being axially tiltably mounted on the member with which it is drivingly connected, means limiting the tilting motion of said other of said clutch parts, an axial projection located eccentrically on the end of said one of said clutch parts, a concentric annular face on the other of said clutch parts opposed to said projection, an axially yieldable member biasing said other clutch part to a perpendicular position of its face with respect to the member with which it is drivingly engaged, and means for selectively moving said clutch parts relatively axially into flat abutting contact between said annular face and said projection.

17. A clutch comprising coaxially arranged driving and driven members, coacting driving and driven clutch parts non-rotatably connected one to each of said members, one of said clutch parts being non-tiltably mounted with respect to the member to which it is drivingly connected, the other of said clutch parts being axially tiltably mounted on the member with which it is drivingly connected, means limiting the tilting motion of said other of said clutch parts, an axial projection located eccentrically on the end of said one of said clutch parts, a concentric annular face on the other of said clutch parts opposed to said projection, and means for selectively moving said clutch parts relatively axially into flat abutting contact between said annular face and said projection.

References Cited in the file of this patent

UNITED STATES PATENTS

| 2,023,772 | Russo | Dec. 10, 1935 |

FOREIGN PATENTS

| 234,563 | Germany | May 13, 1911 |
| 725,571 | Great Britain | Mar. 9, 1955 |